(12) United States Patent
Postnikov et al.

(10) Patent No.: US 10,990,698 B2
(45) Date of Patent: Apr. 27, 2021

(54) DEVICE FOR SECURE COMPUTING THE VALUE OF A FUNCTION USING TWO PRIVATE DATASETS WITHOUT COMPROMISING THE DATASETS AND METHOD FOR COMPUTING THE SOCIAL RATING USING THE DEVICE

(71) Applicant: Roman Vladimirovich Postnikov, Moscow (RU)

(72) Inventors: Roman Vladimirovich Postnikov, Moscow (RU); Maksim Vladislavovich Voevodskii, Luberzi (RU)

( * ) Notice: Subject to any disclaimer, the term of this patent is extended or adjusted under 35 U.S.C. 154(b) by 0 days.

(21) Appl. No.: 16/676,542

(22) Filed: Nov. 7, 2019

(65) Prior Publication Data

US 2020/0364378 A1   Nov. 19, 2020

(30) Foreign Application Priority Data

May 17, 2019   (RU) ........................... RU2019115259

(51) Int. Cl.
*G06F 21/62*      (2013.01)
*G06F 21/30*      (2013.01)
(Continued)

(52) U.S. Cl.
CPC .......... *G06F 21/6245* (2013.01); *G06F 21/30* (2013.01); *G06F 21/78* (2013.01);
(Continued)

(58) Field of Classification Search
CPC ............... G06F 21/602; G06F 21/6218; G06F 21/6245–6263; G06F 21/78; H04L 9/008;
(Continued)

(56) References Cited

U.S. PATENT DOCUMENTS 9,015,853 B2   4/2015   Stefanov et al.
9,577,829 B1   2/2017   Roth et al.
(Continued)

FOREIGN PATENT DOCUMENTS

RU        2376635 C2   12/2009

*Primary Examiner* — Kevin Bechtel

(57) ABSTRACT

The invention relates to data protection means and can be used for cooperative computing by two or more parties without revealing to each other the private data used. The technical result is to ensure the privacy of large amounts of data belonging to different parties, and to reduce the amount of memory secured from unauthorized reading during computations. Such an effect is achieved due to forming the first and the second private datasets, where the first and the second private datasets use user identifiers, wherein the first private dataset contains user ratings matched to the user identifiers, and the second private dataset, for each of the user identifiers, contains an array of user identifiers from the social environment of the respective users; by the user identifiers from the social environment of the selected user, computing the social rating of the selected user as a function of the number of users from the social environment and the rating values of the users from the social environment. Wherein the data on social ratings of users are transmitted in encrypted form.

33 Claims, 3 Drawing Sheets

(51) Int. Cl.
*G06F 21/78* (2013.01)
*G06F 21/86* (2013.01)
*H04L 9/08* (2006.01)
*H04L 9/32* (2006.01)

(52) U.S. Cl.
CPC ............ *G06F 21/86* (2013.01); *H04L 9/0894* (2013.01); *H04L 9/3247* (2013.01)

(58) Field of Classification Search
CPC ....... H04L 9/088; H04L 63/0428–0442; H04L 2209/46
See application file for complete search history.

(56) References Cited

U.S. PATENT DOCUMENTS

| | | |
|---|---|---|
| 2012/0002811 A1 | 1/2012 | Smart |
| 2014/0129420 A1* | 5/2014 | Howe ................... G06Q 50/01 705/38 |
| 2015/0371059 A1* | 12/2015 | Bilogrevic .......... G06F 21/6245 726/26 |
| 2017/0093806 A1 | 3/2017 | Phegade et al. |
| 2017/0372091 A1 | 12/2017 | Lacey |
| 2018/0145986 A1 | 5/2018 | Chien |

* cited by examiner

DEVICE FOR SECURE COMPUTING THE VALUE OF A FUNCTION USING TWO PRIVATE DATASETS WITHOUT COMPROMISING THE DATASETS AND METHOD FOR COMPUTING THE SOCIAL RATING USING THE DEVICE

The invention relates to data protection means and may be used in computer field for computing in the cases where two (or more) parties want to determine the value or values of a function the arguments of which relate to private data of each party, and the parties do not want to reveal their secret data to each other and to third parties even in the process of computing. In a particular embodiment the invention may be used for computing the so-called "social rating" ("social score"), which allows for assessing the likelihood of a user's conscientious behaviour when providing the user with credits, insurance products or when the user rents real estate or technical equipment.

In general terms, the background of the invention is the task of implementing practical secure computations, when two companies (A, B) possess data ($A_d$, $B_d$, respectively), and can get a useful effect from statistics computed using the combined data. The companies cannot combine data for calculating statistics by disclosing it to another party, since the disclosure of data from one side to the other side may not be acceptable from the point of view of user interests, legislation or economic security. The suggested solution allows for computing statistics in such a way that neither side discloses its data.

In the prior art, for example, in the US patent application US2014129420, published on May 8, 2014, a system and a method for computing social rating are described, which have limitations in practical application. In particular, if the data packages used for cooperative computing of social rating (namely, social relations on the one hand, and the values of each individual's social ratings on the other) belong to different companies on a confidential basis, and the users to whom the information relates may not consent to transfer the information outside the credit institution or social network, the system and the computation method of the invention US2014129420 are not applicable in practice, since they involve the disclosure of both datasets in the process of computing social rating at least to the owner of the server where the computation takes place.

Methods and devices for secure multi-party computations are also known, for example, those disclosed in the US patent U.S. Pat. No. 9,577,829B1, published on Feb. 21, 2017 and the US application US20170093806A1, published on Mar. 30, 2017, where the main approach is to use physically and logically protected devices to which all the parties may confide their data. However, these methods and devices assume that all the data are completely placed in protected devices. This assumption has practical limitations in cases when the data size is large, since the memory size of such protected devices is limited (see US20120002811A1, paragraph [0011]).

If not all the data are stored in the memory of the protected device, the third-party observers can partially extract the private data of the parties by observing the access pattern of the protected device to encrypted data not placed into the memory of the protected device.

Further methods and devices describing a solution to this problem, for example, disclosed in the US patent U.S. Pat. No. 9,015,853B2, published on Jan. 2, 2014, are known. They conceal the pattern (access pattern to the external disk storage or RAM) from the observer by secure shuffling of encrypted data on external storage before starting the computations. However, this approach has practical limitations, since it increases the computational complexity of functions by at least 20-35 times (section 1.1 of the U.S. Pat. No. 9,015,853B2).

Thus, in the prior art, there is a need to implement secure computations using large data arrays without using large capacity storage units within the security perimeter of secure computing units and without repeatedly increasing computational complexity when concealing the access pattern to the external disk storage or RAM. Moreover, the presence of such devices and methods can provide the ability to secure and accurate computation of users' social scoring.

The method and device as suggested ensure the achievement of a technical effect, which consists in solving the above problems existing in the prior art, as well as in providing privacy to large amounts of data belonging to different parties, ensuring a reduction in the amount of memory secured from unauthorized reading, as well as guaranteeing confidentiality of data users. In particular, the method and device as suggested can be used for secure computation of a social rating, when the owner of the data on social relations and the owner of the data on individual social ratings can compute social ratings without disclosing their data to anyone, even to each other.

In addition, none of the two or more parties discloses its data to any other party, with the exception of the results of processing statistics, the computation algorithm of which is agreed in advance by the parties, the complexity of operations for processing statistical data using the suggested invention does not increase compared with the usual computation of statistics with combined data.

To achieve said technical effect the device for secure computing the value of a function using two private datasets without compromising the datasets comprises:

a functional data interface, configured to retrieve data from an open dataset (4), and a service interface for transmitting the function computation results (6), wherein the first and the second private datasets (20, 13) use identifiers from a common set of identifiers;

the second private dataset (13) contains data arrays, wherein each dataset corresponds to one of the identifiers of the common set of identifiers, and each array contains a set of identifiers from the identifiers used in the first private dataset;

in the open dataset (4), each of the identifiers is matched with a value from the first private dataset encrypted with the first encryption key and configured to decrypt with the first decryption key the values encrypted with the first encryption key, and and the values matched to the identifiers from the first private dataset are used as function arguments;

the device containing:

a protected storage area (8) that stores the first decryption key;

physically protected computing unit (9) configured to decrypt the values with the first decryption key and compute the electronic signature value of the function computation result using the electronic signature key stored in the protected storage area;

the computing unit (9) is configured to provide:

storing the first decryption key of the key pair "the first encryption key-the first decryption key" in the protected storage area (8) of the computing unit, wherein the first encryption key is used to encrypt values from the first private dataset;

computing (6) the value of a function for an identifier selected from a common set of identifiers by obtaining (3), through the functional interface, data from an open dataset corresponding to the identifiers from the data array corresponding to the requested identifier;

decrypting (16) the encrypted data with the first decryption key to obtain the values used as function arguments, computing the function value, computing (6) the electronic signature value of the function computation result using the electronic signature key, and transmitting (7) the function value (18) together with the computed electronic signature value over the service interface.

In particular embodiments, a storage unit protected against physical access is used as the protected storage area, while the connections between the protected storage area, the computing unit, as well as the functional and service interfaces are provided inside an integrated body with physical access protection, the first encryption key may be used as the electronic signature key, the physically protected computing unit may be designed as a processor, the storage protection may be ensured by data encryption on the processor side, and the computing unit is configured to provide generation of the pair "the first encryption key-the first decryption key", with the transmission of the first encryption key for encrypting the values from the first private dataset.

Moreover, the device can be configured to store the second decryption key from the key pair "the second encryption key-the second decryption key" in the protected storage area of the computing unit, wherein the second encryption key is used to encrypt a set of data from an open dataset corresponding to the identifiers of the data array corresponding to the requested identifier before transmission to functional interface, and the device is configured to decrypt said data with the second decryption key; and the second encryption key may be used as the electronic signature key.

The device may be configured to be installed within the security perimeter (21) of the first private dataset owner or may be installed within the security perimeter (20) of the second private dataset owner. The subscribers' telephone numbers or other personal identifiers may be used as identifiers and the subscribers' credit ratings may be used as the values. Besides, each of the arrays of the first dataset may contain telephone numbers of the subscribers interacting with the subscriber, whose telephone number is an identifier corresponding to the array, and for each of the telephone numbers of the subscribers interacting with the subscriber corresponding to the array, a weight coefficient corresponding to the "communication level" is specified, and when computing the function, each of the identifiers changes according to the value of the weight coefficient. Besides the weight coefficient may depend on the average conversation time per day, and the device may be prevented from re-requesting to compute a function corresponding to one of the identifiers of the common set of identifiers. The device may be configured to load the first decryption key into the memory under the control of the parties owning the first and second datasets, and before using the functional interface, to provide authentication of the data processing unit and secured exchange of private keys are provided, one of the keys being used for encryption and the other for decryption of messages transmitted through the service interface. The device may be configured to become disabled after execution of a predetermined number of requests.

To achieve the technical effect as above, when computing the social rating, the method for secure computing the social rating of a selected user comprises:

forming the first and the second private datasets (4), where the first and the second private datasets use user identifiers, wherein the first private dataset contains user ratings matched to the user identifiers;

the second private dataset, for each of the user identifiers, contains an array of user identifiers from the social environment of the respective users, forming (31, 52) a pair "the primary encryption key-the primary decryption key", where the primary encryption key is public, the primary decryption key provides the decryption of data encrypted with the primary encryption key, and the primary encryption key is stored in a copy-protected storage area of the private data processing unit;

forming (11, 35, 55) an open dataset in which the rating values are replaced by the corresponding rating values encrypted with the encryption key;

setting (12) the identifier of the selected user;

by the user identifiers from the social environment of the selected user, selecting and transmitting (15, 37, 57) encrypted user ratings from the social environment of the selected user to the private data processing unit;

decrypting (16, 38, 58) the values of user ratings inside the private data processing unit; and computing (6, 39, 59) the social rating of the selected user as a function of the number of users from the social environment and the rating values of the users from the social environment.

Wherein the user rating or the user actuarial rating may be used as the user rating, and the value of the social rating of the selected user may be computed as the arithmetic mean of the ratings of users from the social environment of the selected user. Besides, the value of the social rating of the selected user may be computed using a machine learning model.

In a particular embodiment the method an additional key pair is formed (52) from the additional encryption key and the additional decryption key, wherein the additional decryption key is stored in the copy-protected storage area of the private processing unit, while the set of the selected and encrypted user ratings from the second private dataset for the selected user is encrypted along with an additional decryption key (57) before being transferred to the private data processing unit and decrypted (58) with the additional decryption key inside the private data processing unit for computing the social rating for the selected user.

Besides, several additional second private datasets and several pairs of second additional encryption keys and second additional decryption keys are formed according to the number of additional second private datasets, wherein the second additional decryption keys are stored in the copy-protected storage area of the private processing unit for each of the additional second private datasets, while the set of the selected and encrypted user ratings from the additional second private dataset is encrypted along with the corresponding second additional decryption key before being transmitted to the private data processing unit, and decrypted with the second additional decryption key inside the private data processing unit, and the social rating of the selected user is computed for the data sets from the second private dataset of all the decrypted first and second data along with the data sets from all the additional second private datasets. Wherein for each of the social environment identifiers of the second private dataset, a weight coefficient corresponding to the "communication level" may be specified, and while computing the function, each of the corresponding ratings changes in proportion to the value of the weight coefficient.

In another particular embodiment, the primary decryption key may be generated under the control of the parties owning the first and second datasets, and before using the functional interface, authentication of the data processing unit and secured exchange of private keys may be provided, one of the keys being used for encryption and the other for decryption of messages transmitted through the service interface. The subscribers' telephone numbers or other personal identifiers may be used as identifiers.

A private data processing unit may be installed within the security perimeter of the first private dataset owner or may be installed within the security perimeter of the second private dataset owner. The weight coefficient used in the method suggested, depends on the average conversation time per day.

The description of the suggested invention is accompanied by drawings, where:

FIG. 1 schematically shows a generalized embodiment of the device,

Figure 1:
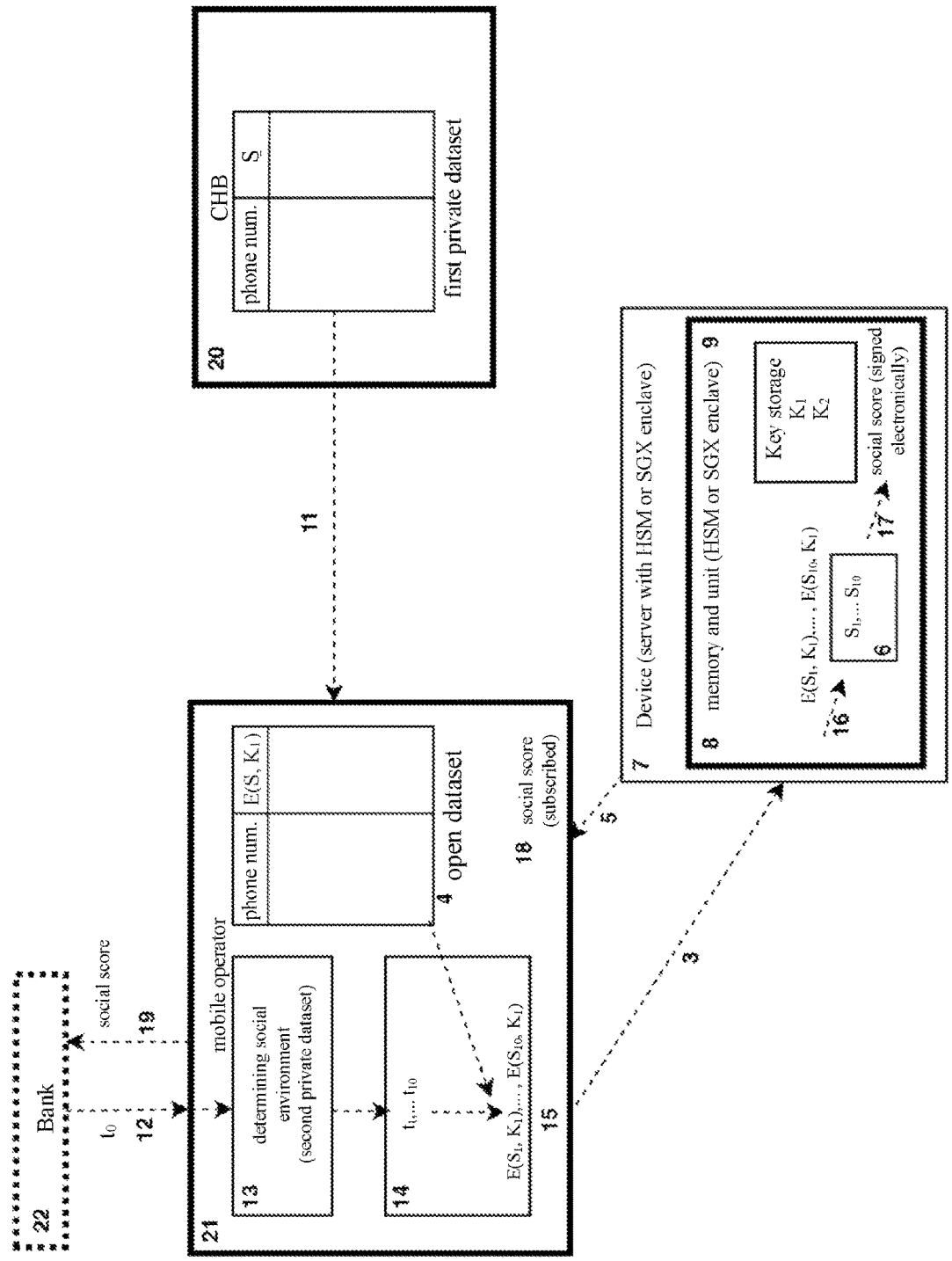

As shown in FIG. 1, the suggested device 7, made in the form of a server with installed HSM or SGX combining a protected memory (8) and a computing unit (9), is used as part of a system that contains a bank 22, acting as an ordering party and transmitting the user identification data $t_0$ at step 12. The system uses the perimeter of the mobile operator 21, hereinafter also referred to as A, which provides and forms the second private dataset 13 containing information about the user's social environment, and the perimeter of the Credit History Bureau (CHB) 20, hereinafter also referred to as B, inside which the first private dataset is stored used to form an open dataset 4 which is transmitted to the mobile operator to be used within the perimeter of the mobile operator. The first private dataset contains the credit ratings of S users, and in the open dataset, the credit ratings are replaced by the credit ratings $E(S, K_1)$ encrypted with the first encryption key $K_1$. At step 11, the open dataset is transmitted inside the perimeter of the mobile operator. Here and in the claims, the perimeter refers to the boundaries of the computer system, for which organizational measures and technical means are used that exclude unauthorized information leakage from the inside of the perimeter, including preventing malicious codes used for unauthorized transmission of information from starting inside the perimeter. As organizational measures, restrictions on employee access levels may be used. The technical means are implemented, for example, by using personal access cards, biometric scanners or individual logins and passwords recognized by information security systems.

As shown in FIG. 1, in the process of functioning of the device as part of the system, at step 14, the mobile operator generates a list of users $t_1, \ldots, t_{10}$ from the social environment of the user selected to compute social scoring or rating and, in step 4, selects from the open dataset the encrypted credit user ratings from the social environment of the selected user.

At step 3, the selected encrypted credit ratings are transferred to the input of the device 7 for secure computation of the function value directly inside the HSM or SGX with a protected memory (8) and a computing unit (9). At step 16, the encrypted values are decrypted using the first decryption key from the pair, the first encryption key being the first decryption key, after which at step 17, the value of function (6) is computed in such a way that information about the arguments used to compute the function cannot be read outside the perimeter of the HSM or SGX (7) and (8). At step 17, an electronic signature is generated, for example, by computing a hash of the function value according to pre-defined rules, and at step 5, the value of the function along with the electronic signature is transmitted to the mobile operator, which transmits the received data to the bank 22 or another ordering party at step 19.

At the same time, a device, combining 7 and 8, for secure computation of the function value may be located inside the perimeter of the mobile operator, or it may be a stand-alone server containing the Intel® processor enclave in SGX mode and its software and hardware support.

Figure 2:
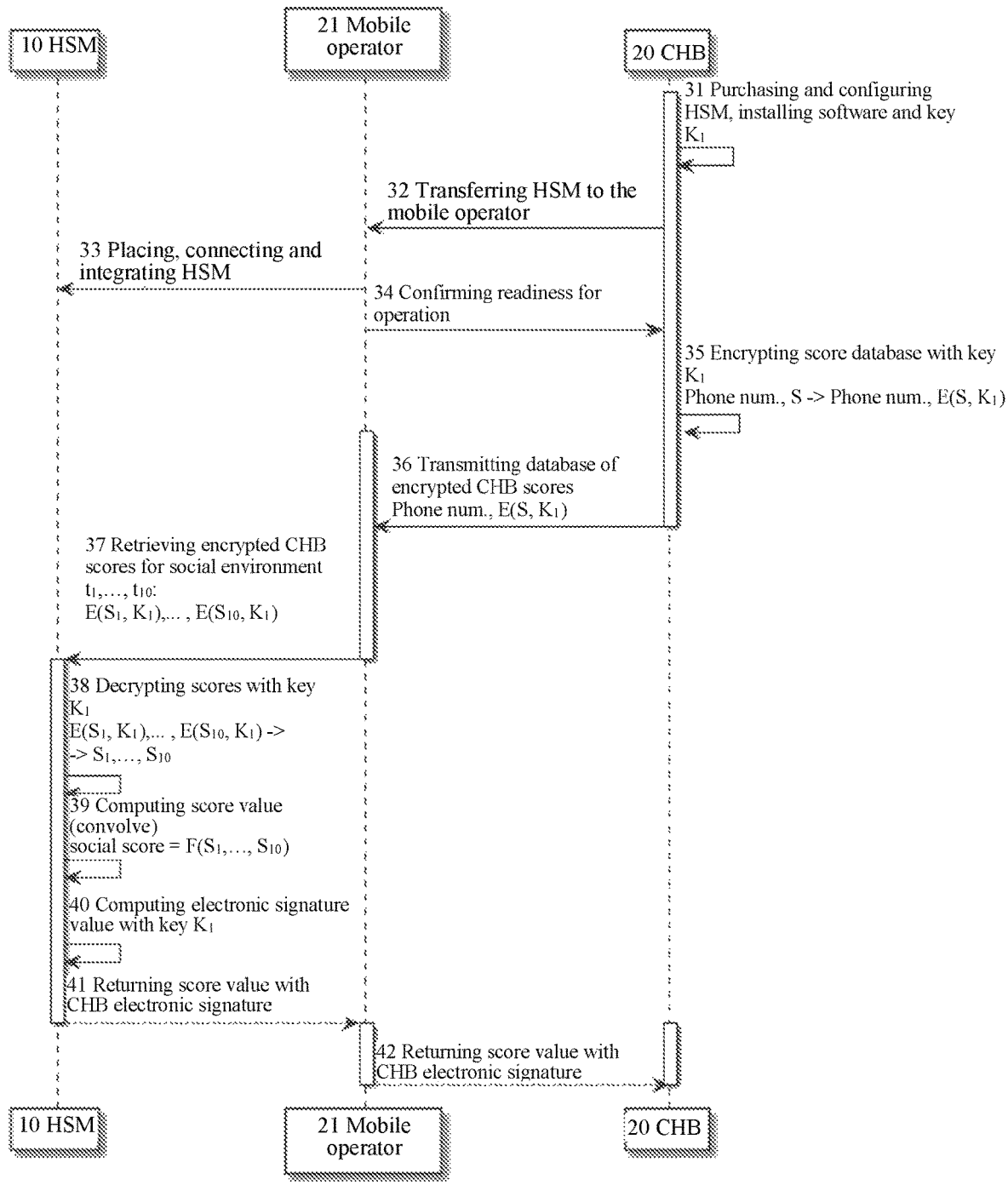
FIG. 2 shows the order of operations during the implementation of the method and the device using the Hardware Security Module (HSM) (a.k.a. Secure Coprocessor) (IBM, Gemalto, Thales)

As shown in FIG. 2, in one of the basic cases of the invention, when using the device for secure computation functions inside the perimeter of the mobile operator, at step 31 of the CHB 20, the HSM is purchased and configured, the software (hardware control codes) and the key $K_1$ are installed. At step 32, the HSM is transferred to the mobile operator 21, which, at step 33, places, connects and integrates HSM 10 within the perimeter of its system, and after completing the settings, at step 34 confirms that the system is ready for operation.

After receiving the confirmation about readiness of the system for operation and making it possible to use the encryption key $K_1$ from a symmetric or asymmetric pair of encryption keys, the CHB encrypts the actual scores at step 35, for example, credit ratings with $K_1$ encryption key and transmits the encrypted data used in step 36 along with public user identifiers to the mobile operator. At step 37, the mobile operator selects the scores corresponding to the social environment and transfers the selected scores to the HSM 10. At step 38, the selected scores are decrypted, and at step 39, the value of the function F is computed using the decrypted values and, if necessary, additional parameters, for example, weight coefficients. At step 40, the electronic signature value is computed. At step 41, the computed value and the electronic signature value are transmitted to the mobile operator or other related party. At step 42, the computed value is transmitted to the CHB or to the bank that has ordered the computation.

Figure 3:
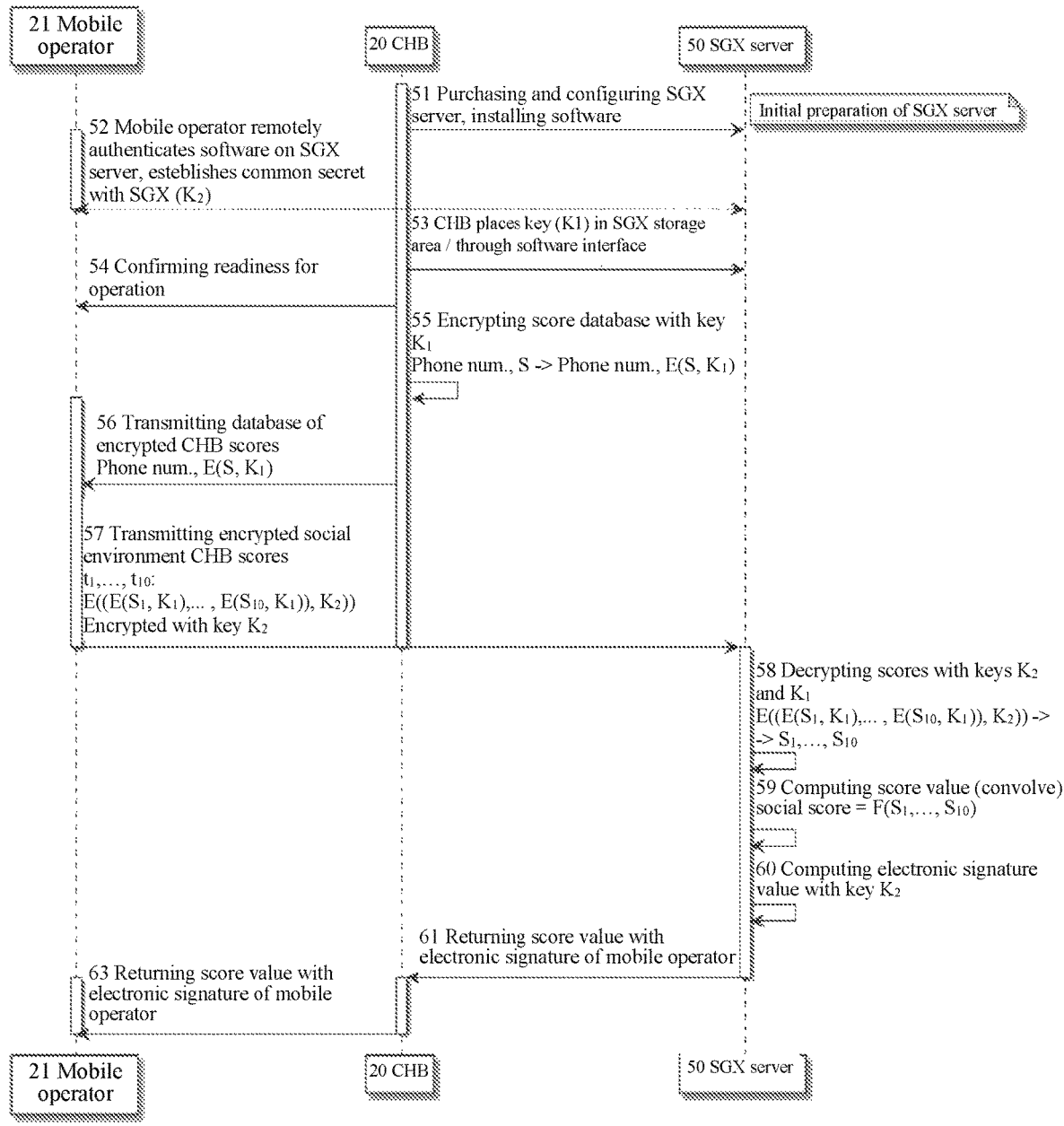
FIG. 3 shows the order of operations during the implementation when using a secure Intel SGX device to implement the method and the device.

As shown in FIG. 3, in an alternative embodiment of the invention, when the device for secure computation of the function is located outside the perimeter of the mobile operator (for example, in the perimeter of the CHB), at step 51 of the CHB 20, purchase and initial preparation, configuration of SGX, and installation of hardware control codes are made. At step 52, the mobile operator remotely authenticates the software on the SGX server, sets the key $K_2$ from the common pair "the second encryption key-the second decryption key". At step 53, the CHB 20 places the first decryption key $K_1$ in the memory of the SGX enclave in a safe mode and after completing these operations, at step 54, the CHB confirms that the system is ready for operation.

After receiving the confirmation about readiness of the system for operation and making it possible to use the keys $K_1$ and $K_2$, at step 55 the CHB encrypts credit ratings with $K_1$ encryption key and transmits the encrypted data used in step 56 along with public user identifiers to the mobile operator. At step 57, the mobile operator selects the scores encrypted with the key $K_1$ and corresponding to the social environment, encrypts the set of the selected scores encrypted with the key $K_2$, and transmits the encrypted set of the selected scores to the server with SGX 50. At step 58, the set of the selected scores are decrypted with the key $K_2$, and at step 59, the selected scores are decrypted with the key $K_1$, and at step 60, the value of the function is computed using the decrypted values and, if necessary, additional parameters, for example, weight coefficients. At step 61, the electronic signature value is computed. At step 63, the computed value and the electronic signature value are transmitted to the CHB operator or other related party.

In other words, B can, for example, buy or rent HSM such as SGX in the cloud, but not transmit it to A.

The public software key (of the SGX enclave) inside the authorization certificate can be verified by any other (3rd, 4th, etc.) party, thus achieving the main advantage of the alternative scheme—its scalability to any number of participants, and as a result, no need for both/all parties to be present when downloading the software into the HSM. This property is achieved by supporting the Remote Attestation procedure from the SGX.

An alternative implementation scheme is implemented when A is a mobile operator, and B is the CHB. Obviously, encryption should be performed in a mode that does not allow for verification of the encrypted identical values.

Thus, the basic embodiments allow for solving the problem of computing statistics on the data of the companies A and B, while neither A nor B discloses their data.

In particular cases of implementation, the suggested technical solution can be used for list sorting without disclosing the sorted data, as well as for quantifying the user's creditworthiness, taking into account the parameters of his/her social environment. For example, the users in whose social environment they have a large number of people with loan delays may have a lower credit or social rating than the users with no loan delays in their social environment. Credit scoring (credit rating) of an individual is a parameter (individual rating) which is determined on the basis of the user's behaviour over a long period of time and is designed to assess the probability of loan default or fraud. The credit rating is determined objectively and subjectively, using expert judgement, based on a set of data characterizing the user. These data may include: gender, age, place of birth and residence, the presence of a permanent job and income, the availability of a car and other property, the frequency of changing phone numbers, the number and size of previously taken and repaid loans, as well as payment delays, etc.

Information about previously provided loans and the cases of the user's delays, as a rule, is collected by the Credit History Bureau (CHB) or similar institutions, interacting with the user authorized by financial institutions, in public and with his/her consent.

The traditional credit rating or scoring as well as the scoring of individuals does not take into account one important feature. It is the user's creditworthiness that is determined not only by subjective factors determined by the user himself, but also by the creditworthiness of the behaviour peculiar to other users who are a part of the user's social environment or his/her communication circle. For example, if one marital partner has an excellent credit history, but the other marital partner has a significant mortgage delay recently occurred, then the former is most likely not to be given a soft loan, as this will lead to the re-crediting of this real estate, and as a result to the loan delay and/or default.

Opposite scenarios of the social environment influence on the creditworthiness are also possible: if a young person does not have a credit history, which is regarded negatively by most financial institutions, but his parents have excellent credit histories, or most of his social circle have already taken and always surrendered loans, then most likely a loan can be approved for this person, and without taking into account the presence of the social environment, the loan to the user would be denied.

Social environment is not only and not necessarily family, parents, colleagues, or friends. Determining exactly that part of social environment which really has an influence (positive and/or negative) on the creditworthiness of a person is a particular sub-task within the task of improving credit scoring due to the social scoring. This subtask is solved using machine learning algorithms, where the entire social environment (for example, 100 people) is input, and the model itself determines those who make the largest contribution to determining the creditworthiness of the person.

Thus, the solution to the problem of improving the accuracy of credit scoring for individuals requires receiving and processing of 2 types of data: the social environment (circle of communication) of the person, and CHB data for each individual inside the social environment. The social environment can be computed, in particular, by a mobile operator, based on calls, facts of SMS sending, and geodata.

The task of computing social scoring or rating, in a particular case, is determined as follows: at the request of a bank or other related party, for example, an insurance company, the average credit worthiness of a person's social environment based on data from a mobile operator or social network administrator and a credit history bureau is to be computed.

In this example: A—is a mobile operator, which for each owner of the phone number $X_0$ has a list of his/her social environment $X_1$-$X_{100}$: i.e. a list of phone numbers of the top 100 people with whom the subscriber of number $X_0$ communicates. If the social environment of the subscriber is less than 100 people, the size of the list of the social environment phone numbers is reduced proportionally.

Thus, $A_d$—is a database for each subscriber storing a list of phone numbers of his/her social environment. B—is the Credit History Bureau (CHB), which stores for each individual his/her credit score (in particular, in the combination the user—the phone number/social network identifier/e-mail—score (CHB rating). Thus, $B_d$—is a database that stores the score of the CHB for each phone number X (CHB score (X)).

The formula for computing the statistical score $CC_{avg}(X_0)$ or the credit score from the combined data, that is, the average value of the creditworthiness of the social environment for the subscriber X is as follows:

$$CC_{avg}(X_0) = [score_{CHB}(X_1) + score_{CHB}(X_2) + \ldots + score_{CHB}(X_{100})]/100$$

The computing formula can be further adjusted not only by averaging individual CHB scores, but also taking into account the score weights in the graph of the social environment. The weights can be computed at the stage of determining the social environment, for example, by assessing the proportion of voice calls and their duration for each person of the social environment with the subject of scoring.

The computation of the creditworthiness level of the social environment can be done not based on the above formula, but also by creating and using a machine learning model, where separate social environment scores provided by the CHB, with certain weights (reflecting, for example, the social proximity of a particular person to the user) are sent to the input of the model, and at the output of the model, the score of the social environment is formed.

In the process of computing, the data besides the result of processing the scores of the social environment, should not be used in public by the parties that do not possess relevant information, regardless of the method used to compute the social score (the formula or the model of machine learning).

The suggested method and device provide the possibility of implementing this requirement not only for a simple scalar, but also for a full-fledged graph of social environment with a complex set of weight coefficients.

Due to the fact that the mobile operator fixes the contacts of other operator subscribers, the computation of social scoring is reliable even without involving all the possible mobile operators.

The basic hardware used to implement the suggested method and device is the Hardware Security Modules (HSM), designed to be used in scenarios that differ from the suggested method. In particular, the HSM is used to protect against unauthorized access to highly sensitive data and to highly sensitive data processing within one company, and not in 2 or more companies, as suggested in this application.

In most commercial applications, HSMs are used by banks to store and process PIN codes (personal access codes) for credit and debit cards. HSM provides such a high level of protection against unauthorized access that even system administrators and security officers who have all the private keys and authorities cannot access PIN codes. In other words, no one is able to access the security algorithms even having direct physical access to the servers and data storages where the encrypted data are stored. Processing, that is, reconciliation of the stored PIN code with the PIN code entered to the ATM, for operation authorization or denial; change of PIN code by the client; etc. are made inside the HSM with almost absolute protection against interception of the decrypted data by intruders.

The standard HSM supports functions and has properties that can be applied in partial implementation of the suggested method and device. In particular, the basic functionality provides decryption of the incoming and encryption of the outgoing data, execution of the loaded processor control instructions. The owner of the HSM may download the private key into it, and the executable codes that can use this private key to decrypt the data received in the HSM, and to encrypt or to create an electronic digital signature (EDS) of the data released from the HSM in accordance with a predefined behaviour.

The HSM is in an unprotected state during the initialization ("aimed state") process, when the owner (usually: two or more senior security officers of the company) loads the private key and control codes into it. This procedure is performed in a special protected room, since in such an unarmed state, the HSM is vulnerable. When an HSM is set into armed state, no one (not even security officers) may access the key, the program, and the data inside the HSM. In the event of a physical or logical attempt to access the HSM inside, the HSM instantly destroys all the data, including the key, codes and downloaded data, and turns into an empty, uninitialized HSM that does not contain any data at all.

Generating keys inside the HSM and pairing the HSM allows for withstanding the scenario, where all the security officers involved in the HSM setting into armed state, cooperate to steal a copy of the private key from the safe room when it is uploaded to the HSM. To eliminate this negative scenario, there is a special way of setting the HSM into armed state, when the private key is not loaded into the HSM by security officers, but is generated inside the HSM and never leaves the HSM.

However, this approach leads to the risk of data loss, since if the HSM fails, the private key is also completely along with the data (for example, the database of the bank PIN codes) encrypted with this key. To reduce this risk, HSMs usually support special functionality of the so-called coupling (pairing): under strictly defined conditions, during the armed stage, in a safe room and with the participation of security officers, the private key generated in one HSM can be transferred for storage and use to another or other HSMs used as a backup hardware copy.

The leading manufacturers of HSM are: IBM, Gemalto, Thales. Also, the HSM analogue is the SGX technology by Intel, which since 2015 allows for using Intel processors in the HSM unit mode.

In an alternative basic embodiment of the invention, designed primarily for use with SGX technology, when the processor is used as the basic HSM hardware, and the hardware of the unit memory is emulated by encrypting the data used for storage in an external storage unit. The main difference between using another type of HSM (in the form of SGX) is also the ability to place SGX in the circuit of the CHB (and not of the mobile operator).

An alternative embodiment supports an unlimited number of participants-owners of private data whose data are used in secure computations (unlike only 2 participants in the basic scheme with HSM).

In extended examples of implementation, to eliminate data leakage from the $B_d$ as a result of monitoring the HSM accesses to the external storage by A, all the data of the mobile operator (the whole social environment) and all the CHB data (all score values in relation to mobile phone numbers) are not loaded to the HSM. Instead, only the data necessary for computing the social environment creditworthiness statistics of one subscriber are uploaded to the HSM at a time. That is, for example, 100 encrypted credit scores by the CHB, which correspond to the social environment of the particular subscriber. Thus, the CHB is required not to transfer its data E ($B_d$, $K_b$) by a single encrypted unit, which cannot be loaded into the HSM, but to encrypt the value of each score individually.

Additionally, to prevent party A (the mobile operator) from observing the frequency of the encrypted score values, when encrypting the scores, it is necessary to add randomization, which nevertheless allows the HSM to uniquely restore by decryption the exact score values. For randomization, a standard approach is used with the addition of the so-called nonce to the data before encryption and/or the addition of data included in the social environment with a zero weight coefficient.

When the code certification for A cannot be performed by the standard HSM functional, it is suggested to use the certification of the statistics computation code inside the HSM for compliance with the code agreed between A and B. This minimizes the risks associated with the fact that party B will load a modified algorithm. In the suggested embodiment, party B downloads the code not in its safe room, but in the room in the perimeter of party A. At the same time, party A provides a tunnel or an SSL-encrypted channel, safe for party B, to the HSM. During the download procedure, party A may observe or determine a control sum or a checksum of the executable code downloaded into the HSM by party B, and compare this checksum with the checksum of the executable code agreed by the parties for downloading.

The control of the number of statistics computation starts initiated by party B is implemented by using the so-called computation certificates. Inside the HSM, a counter is implemented in hardware and software, the value of which is decremented or reduced with each statistics computing or processing. When the counter value becomes equal to zero, the HSM stops executing requests for statistics computation (coming from party A). To continue the work, it is necessary for party B to sign a certificate for executing C of new computations, after which it transmits the certificate to party A, which uploads the certificate through a special interface to the HSM, and the HSM assigns the counter with the value C. Additionally, to exclude the possibility for A to submit artificial data for computing the statistics, party B in agreement party A provides the HSM with functions of artificial data ($A_d$) control, for example, the control of zero values of A when not equal to zero. If the functions of artificial data ($A_d$) control are triggered, instead of the statistics computation result, the HSM should give a result in the form of a message on the artificial data control function being triggered, simultaneously with decrementing the counter of the number of authorized starts.

Remote monitoring of the device by party B is implemented by signing the statistics with a private key located inside the HSM. Thus, party B can be sure that party A has not modified the statistics from the HSM when transmitting to party B.

To prevent leakage of the private key $K_b$ from B to A, the previously described HSM pairing mechanism is used. In addition to the HSM to be transmitted from party B to party A, party B sets up the second HSM in its perimeter. Before transmitting the HSM to A, party B "pairs" it with the second HSM, which remains in the perimeter of B. Thus, the security officers will not know the private key, only two HSMs will "know" it, while the second HSM will perform the function of encrypting data of party B for transmitting to the perimeter of party A.

In some cases, there may be a third party (E), the information obtained from which can improve the accuracy of the social rating computation.

In these cases, if the legal regulation and technical methods of depersonalization allow for transferring a new type of data from party E to party A (for example, if the bank can transfer an anonymized transfer graph to a mobile operator for social graphs production accounting), then these new data are simply taken into account in the data of the corresponding parties A or B, and then the social rating computation is carried out according to the procedure described above.

If the legal regulation and technical methods of depersonalization do not allow for transmitting a new type of data from party E, the social rating for party E can be independently computed, and then social ratings are combined or consolidated on the customer side. This approach can be expanded to any number of additional participants. The consolidation rules can be determined in accordance with the methodology for computing the social rating, for example, the computation of the arithmetic mean of the computed ratings (statistics) or the consolidation is carried out taking into account the same identifiers used for computing various ratings.

The invention claimed is:

1. A device for secure computing the value of a function using two private datasets without compromising the datasets, comprising:
   a functional data interface configured to retrieve data from an open dataset, and
   a service interface for transmitting function computation results,
   wherein a first and a second private datasets use identifiers from a common set of identifiers;
   the first and the second private datasets contain data arrays, wherein each dataset corresponds to one of the identifiers of the common set of identifiers, and each data array of the second private dataset contains a set of identifiers from the identifiers used in the first private dataset;
   wherein the open dataset is created from the identifiers each of which is matched with a value from the first private dataset encrypted with a first encryption key and the values encrypted with the first encryption key are configured to be decrypted with a first decryption key, and
   the values matched to the identifiers from the first private dataset are used as function arguments;
   the device containing:
      a protected storage area that stores the first decryption key;
      a physically protected computing unit configured to decrypt the encrypted values with the first decryption key and compute an electronic signature value of the function computation result using an electronic signature key stored in the protected storage area;
   the physically protected computing unit is configured to provide:
      storing the first decryption key of a key pair consisting of the first encryption key and the first decryption key in the protected storage area of the computing unit, wherein the first encryption key is used to encrypt values from the first private dataset;
      computing the value of a function for an identifier selected from the common set of identifiers by obtaining, through the functional data interface, data from the open dataset corresponding to the identifiers from a data array corresponding to a requested identifier;
      decrypting the encrypted data with the first decryption key to obtain values used as function arguments, computing the function computation result, computing the electronic signature value of the function computation result using the electronic signature key, and transmitting the function value together with a computed electronic signature value over the service interface.

2. The device of claim 1, characterized in that a storage unit protected against physical access is used as the protected storage area, while the connections between the protected storage area, the physically protected computing unit, as well as the functional data interface and the service interface are provided inside an integrated body with physical access protection.

3. The device of claim 2, characterized in that the electronic signature key is used as the first encryption key.

4. The device of claim 3, characterized in that it is designed to be installed within a security perimeter of the second private dataset owner.

5. The device of claim 1, characterized in that the physically protected computing unit is designed as a processor.

6. The device of claim 5, characterized in that storage protection is ensured by data encryption on the processor side.

7. The device of claim 5, characterized in that it is designed to be installed within a security perimeter of the first private dataset owner.

8. The device of claim 1, characterized in that the physically protected computing unit is configured to provide generation of the pair consisting of the first encryption key and the first decryption key, with the transmission of the first encryption key for encrypting the values from the first private dataset.

9. The device of claim 1, characterized in that it is configured to store a second decryption key from a key pair consisting of a second encryption key and a second decryption key in the protected storage area of the physically protected computing unit, wherein the second encryption key is used to encrypt a set of data from the open dataset corresponding to the identifiers of the data array corresponding to the requested identifier before transmission to functional interface, and the device is configured to decrypt said data with the second decryption key.

10. The device of claim 9, characterized in that the electronic signature key is used as the second encryption key.

11. The device of claim 1, characterized in that subscribers' telephone numbers or other personal identifiers are used as identifiers.

12. The device of claim 1, characterized in that subscribers' credit ratings are used as the values.

13. The device of claim 12, characterized in that each of the arrays of the first dataset contains telephone numbers of the subscribers interacting with the subscriber, whose telephone number is an identifier corresponding to the array.

14. The device of claim 13, characterized in that for each of the telephone numbers of the subscribers interacting with the subscriber corresponding to the array, a weight coefficient corresponding to a communication level is specified, and while computing the function, each of the identifiers changes according to the value of the weight coefficient.

15. The device of claim 13, characterized in that the weight coefficient depends on the average conversation time per day.

16. The device of claim 1, characterized in that it is prevented from re-requesting to compute a function corresponding to one of the identifiers of the common set of identifiers.

17. The device of claim 1, characterized in that it is configured to load the first decryption key into the memory under the control of the parties owning the first and second datasets.

18. The device of claim 1, characterized in that it is configured to provide authentication of the data processing unit and secured exchange of private keys, one of which is used for encryption and the other for decryption of messages transmitted through the service interface before using the functional interface.

19. The device of claim 1, characterized in that it is configured to become disabled after execution of a predetermined number of requests.

20. A method of secure computing a social rating of a selected user, comprising:
forming a first and a second private datasets, where user identifiers are used in the first and the second private datasets,
wherein the first private dataset contains user ratings matched to the user identifiers;
the second private dataset, for each of the user identifiers, contains an array of user identifiers from a social environment of respective users;
forming a pair consisting of a primary encryption key and a primary decryption key, where the primary encryption key is public, the primary decryption key provides the decryption of data encrypted with the primary encryption key, and the primary encryption key is stored in a copy-protected storage area of a private data processing unit;
forming an open dataset in which there are rating values encrypted with an encryption key;
setting an identifier of a selected user;
according to the user identifiers from the social environment of the selected user, selecting and transmitting encrypted user ratings from the social environment of the selected user to the private data processing unit;
decrypting the values of user ratings inside the private data processing unit; and
computing the social rating of the selected user as a function of the number of users from the social environment of the selected user and the rating values of the users from the social environment of the selected user.

21. The method of claim 20, characterized in that a user credit rating is used as the user rating.

22. The method of claim 20, characterized in that a user actuarial rating is used as the user rating.

23. The method of claim 20, characterized in that the value of the social rating of the selected user is computed as the arithmetic mean of ratings of users from the social environment of the selected user.

24. The method of claim 20, characterized in that the value of the social rating of the selected user is computed using a machine learning model.

25. The method of claim 20, characterized in that an additional key pair is formed from an additional encryption key and an additional decryption key, wherein the additional decryption key is stored in the copy-protected storage area of the private data processing unit, while the set of the selected and encrypted user ratings from the second private dataset for the selected user is encrypted along with the additional decryption key before being transferred to the private data processing unit and decrypted with the additional decryption key inside the private data processing unit for computing the social rating for the selected user.

26. The method of claim 20, characterized in that several additional second private datasets and several pairs of second additional encryption keys and second additional decryption keys are formed according to the number of additional second private datasets, wherein the second additional decryption keys are stored in the copy-protected storage area of the private processing unit for each of the additional second private datasets, while the set of the selected and encrypted user ratings from the additional second private dataset is encrypted along with the corresponding second additional decryption key before being transmitted to the private data processing unit, and decrypted with the second additional decryption key inside the private data processing unit, and the social rating of the selected user is computed for the data sets from the second private dataset of all the decrypted first and second data along with the data sets from all the additional second private datasets.

27. The method of claim 20, characterized in that for each of the social environment identifiers of the second private dataset, a weight coefficient corresponding to a communication level is specified, and while computing the function, each of the corresponding ratings changes in proportion to the value of the weight coefficient.

28. The method of claim 27, characterized in that the weight coefficient depends on average conversation time per day.

29. The method of claim 20, characterized in that the primary decryption key is generated under the control of the parties owning the first and second datasets.

30. The method of claim 20, characterized in that, before using a functional interface, authentication of the private data processing unit and secured exchange of private keys are provided, one of the keys being used for encryption and the other for decryption of messages transmitted through a service interface.

31. The method of claim 20, characterized in that subscribers' telephone numbers or other personal identifiers are used as the user identifiers.

32. The method of claim 20, characterized in that the private data processing unit is installed within a security perimeter of the first private dataset owner.

33. The method of claim 20, characterized in that the private data processing unit is installed within a security perimeter of the second private dataset owner.

* * * * *